United States Patent

[11] 3,628,314

| [72] | Inventors | William C. McCarthy;<br>Merritt V. De Lano, Jr., both of<br>Bartlesville, Okla. |
|------|-----------|---|
| [21] | Appl. No. | 878,383 |
| [22] | Filed | Nov. 20, 1969 |
| [45] | Patented | Dec. 21, 1971 |
| [73] | Assignee | Phillips Petroleum Company |

[54] PACKED-BED RETAINER
7 Claims, 2 Drawing Figs.

[52] U.S. Cl. .................................. 55/387, 23/288
[51] Int. Cl. .................................. B01d 53/04, C01d 9/04
[50] Field of Search .................................. 23/288 R, 288 F; 34/80, 82; 55/74, 387, 388, 389; 196/46.1; 208/146; 210/282, 283, 387, 483

[56] References Cited
UNITED STATES PATENTS

| 2,586,670 | 2/1952 | Lambertsen | 55/387 |
| 2,678,261 | 5/1954 | Ruth | 23/288 F |
| 2,888,333 | 5/1959 | Kearns | 23/288 |

*Primary Examiner*—Reuben Friedman
*Assistant Examiner*—Charles N. Hart
*Attorney*—Young and Quigg

ABSTRACT: A packed-bed retainer which comprises an apertured plate which rests on the surface of the bed to be retained and which is guided to rest on the bed and move downward as the level of the bed drops but which is adapted with means to prevent movement of the plate along the guide in an upward direction.

INVENTORS
W. C. McCARTHY
M. V. DeLANO, JR.

BY

*Young & Quigg*
ATTORNEYS

PACKED-BED RETAINER

This invention relates to particulate bed retainers.

In one of its more specific aspects, this invention relates to self-adjusting retainer means for minimizing disturbances of packed beds.

Operation employing beds of particulate matter such as catalyst, drying agents, Raschig rings, deodorizers and the like, are well known. Such beds frequently have passed through them a quantity of a reactant, the flow of which is in one direction for a period of time after which its flow is reversed. Relatedly, the flow of the reactant through the bed results in agitation of the bed which, upon continued agitation, tends to be disturbed from that position in which it was originally packed in the vessel. As a result, the bed tends to continually redistribute itself as processing through it is continued, particularly in instances of flow reversal.

The apparatus of this invention is directed to retaining such beds of material. According to this invention, there is supplied a bed retainer comprising a movable plate adapted for positioning on the surface of the bed, the plate having an area substantially equal to the area of the surface of the bed, the plate being guided as it moves in a downwardly direction and adapted with means for preventing its movement in an upward direction.

Accordingly, it is an object of this invention to provide a self-adjusting retainer plate for packed beds.

It is another object of this invention to supply a device which stabilizes the pressure drop through packed beds by retaining them in a tightly packed state.

Figure 1:
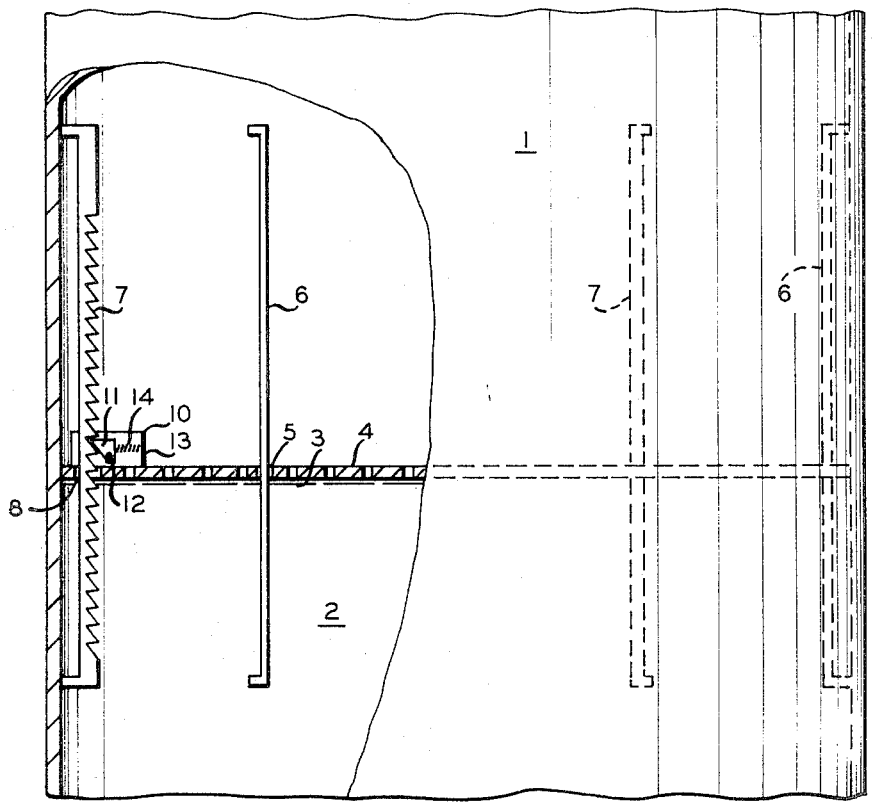
Figure 2:
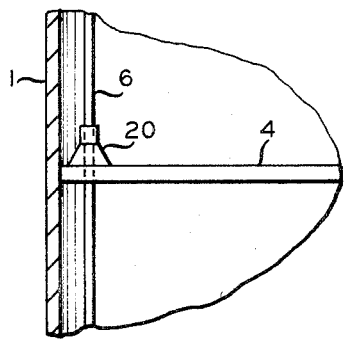

These and other objects of this invention will be apparent from the following description and from the attached drawing in which FIG. 1 depicts one embodiment of this invention employing ratchet assemblies as the retaining means, and FIG. 2 depicts a second embodiment of this invention which employs friction sleeves as a retaining means.

Referring now to FIG. 1, there is shown vessel 1 having packed bed 2 contained therein, the bed extending to its upper surface 3 on which there is positioned retainer plate 4.

Retainer plate 4 is an apertured member of any suitable thickness, the area of the plate being substantially equal to the surface of the bed to be retained. The apertures penetrate the depth of the plate and are adapted for passage of the flowing material therethrough. The plate is adapted at points around its outer periphery with a plurality of holes 5 and 8 through which extend guide rods 6 and ratchet tracks 7, respectively.

Guide rods 6, which are preferably positioned alternately to ratchet tracks 7, are adapted to guide plate 4 so as to seat on the top of bed 2. These guide rods are of any suitable number and are fitted through openings 5 so as to allow unrestricted passage of the plate along the rods without permitting excessive quantities of the fluid to flow through the areas between the rods and the holes.

These rods can be affixed to and supported from the vessel wall in any suitable manner and can be of any desired length. Preferably, they will be of sufficient length to transverse only that distance through which plate 4 moves.

Ratchet tracks 7 penetrate plate 4 through openings 8. Affixed to plate 4 is ratchet assembly 10 comprising a support 13 for the ratchet pawl 11 which is movably hinged at pivot 12 and adapted for continuous engagement with ratchet track 7 by means of spring 14.

While the ratchet assembly can be fixed to the plate, it can alternately be adapted to rest on the plate in unattached relationship.

In the operation of the apparatus of this invention, plate 4 is positioned on the surface of bed 3. Any operation of the bed which causes downward movement of the surface of the bed will result in plate 4 descending along rods 6 and the engagement of the ratchet assembly in track 7.

Any operation of the bed which would cause upward movement of the upper surface of the bed will be substantially avoided, however, inasmuch as the ratchet arrangement limits the extent to which the plate can move in the upward direction, this distance being no greater than the distance between teeth on the ratchet rod. Hence, attrition of the matter comprising the bed is largely prevented by avoiding any appreciable movement of the bed.

While the apparatus as described is a preferable embodiment, other plate-retaining means are suitable. For example, as shown in FIG. 2, the ratchet assemblies can be omitted and the plate can be adapted with rubber sleeves 20 which encompass guide rods 6. These sleeves allow downward movement of the plate as the surface of the bed moves downward but, because of their friction on the rod, bind on the rod and substantially prevent the upward movement of the plate.

Typical of the many uses to which the apparatus of this invention can be put is its employment as a packed-bed retainer in a natural gas recovery process.

A lean natural gas was processed for hexane and heavier hydrocarbon adsorption by activated carbon. The gas contained about 99.9 percent pentanes and lighter and about 0.1 percent hexanes and heavier and was passed downward through a bed of activated carbon. A ratchet-type packed-bed retainer was employed on the top of the bed to hold the carbon in place.

Gas was passed through the bed at a rate of 1.125 MM s.c.f.h. for an adsorption cycle of 40 minutes, the effluent being reduced to a hexane and heavier content of 0.01 percent, about 92.4 percent of the hexanes and heavier being removed.

Upon initial introduction of the gas into the bed, the bed had a random packed height of 12.4 feet. After the adsorption cycle, the height of the activated carbon bed had been reduced. The packed-bed retainer, however, had moved downward with the compacting of the bed and continued to retain the bed.

In the subsequent step, flow by a flushing gas was upward through the bed at a rate of 0.57 MM s.c.f.h. for 25 minutes during which time the bed was regenerated. During this time, the bed was retained in its compacted state in a comparatively nonmovable state by the packed-bed retainer. As a result, disturbance of the bed with resulting channeling and particle attrition were avoided and the bed was also maintained in this more effective state of compaction for the subsequent passages of the gas through the bed.

While the weight of the retainer, itself, is generally sufficient to cause the retainer to move down with the bed along the ratchet or retaining means, extraneous materials such as metal and ceramic shapes can be placed on the retainer plate to facilitate its downward movement.

It will be seen from the above that the retainer plate of this invention provides a process in which a fluid can be passed downward through a packed bed of particulate matter, for any purpose such as adsorption or catalyst contacting, during which it compacts the bed, the flow of the fluid through the bed being thereafter reversed while the bed is retained in that compacted state assumed by the bed in the downward passage of materials through it.

It will be evident from the foregoing that various modifications can be made to the apparatus of this invention. For example, the retainer plate can be adapted with screen; in case the particulate matter of the bed is consumable, the plate can be adapted with external indicating means for purposes of indicating the location of the plate, and the top of the bed, at any time. Such modifications, however, are considered as being within the scope of the invention.

What is claimed is:

1. A packed-bed retainer comprising:
    a. an apertured plate having an area substantially equal to the area of the surface of the bed to be retained, said plate being adapted for gravitational repositioning into contact with said bed upon downward movement of the surface of the bed;
    b. at least one vertically positioned guide adapted to facilitate said gravitational repositioning, said guide penetrating said plate at the outer periphery of said plate, said plate being movably positionable along said guide in a downward direction; and, c. ratchet means positioned proximate the outer periphery of said plate and penetrating said plate for preventing substantial movement of said plate in an upward direction.

2. The apparatus as defined in claim 1 in which said means comprise ratchet means comprising a ratchet track and ratchet assembly.

3. The apparatus as defined in claim 2 in which said ratchet track penetrates said plate and said ratchet assembly is affixed to said plate.

4. The apparatus as defined in claim 3 in which a plurality of ratchet tracks and guides are positioned in alternating relationship around the periphery of said plate.

5. The apparatus as defined in claim 2 in which said ratchet assembly is unaffixedly positioned on said plate.

6. The apparatus as defined in claim 1 in which said means comprises a friction sleeve encompassing said guide.

7. The apparatus as defined in claim 1 in which said guides are of a length substantially equal to that distance over which said plate is positionable.

* * * * *